RICHARDS & LINCOLN.
Fruit-Gatherer.
No. 59,655. Patented Nov. 13, 1866.
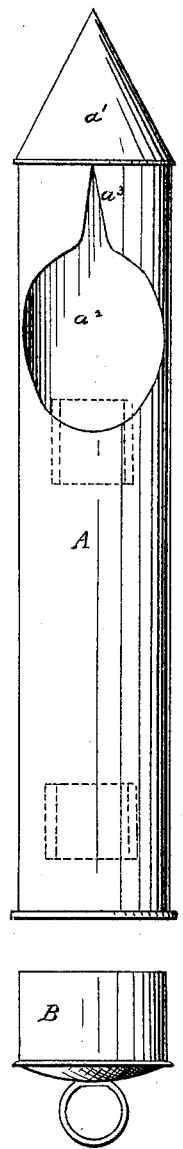
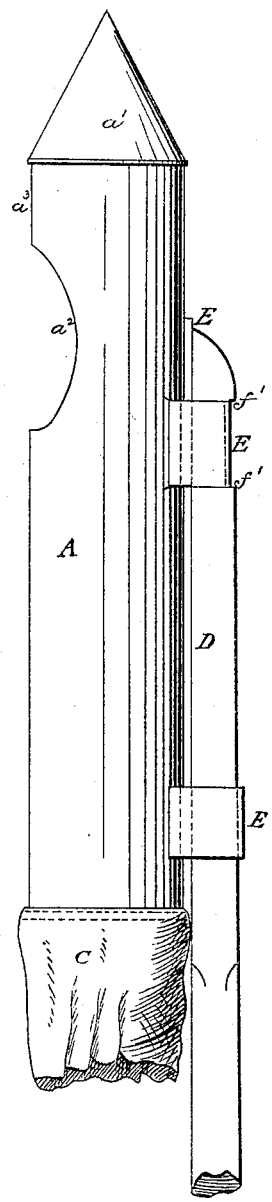
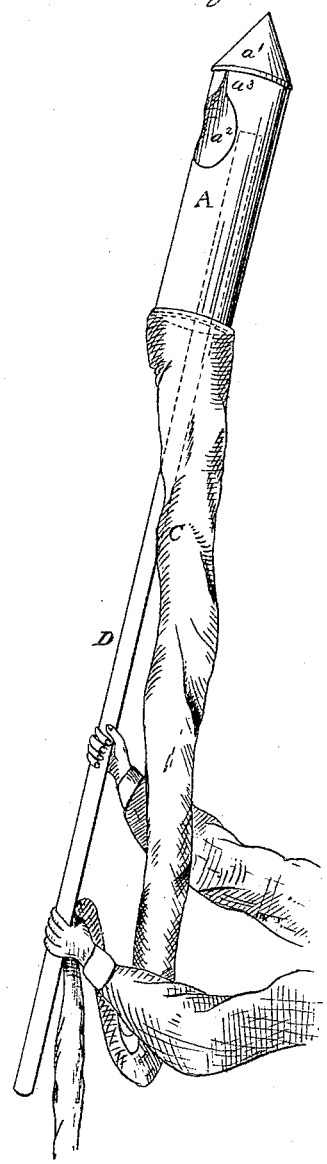
Witnesses:
B. H. Muehle
Levi Brown
Inventor:
L. Richards
D. Lincoln
W. H. Forbush
Atty.

UNITED STATES PATENT OFFICE.

L. RICHARDS AND D. LINCOLN, OF ORANGEVILLE, NEW YORK.

IMPROVEMENT IN FRUIT-PICKERS.

Specification forming part of Letters Patent No. 59,655, dated November 13, 1866.

*To all whom it may concern:*

Be it known that we, LAFAYETTE RICHARDS and DANIEL LINCOLN, of Orangeville, in the county of Wyoming and State of New York, have invented a new and Improved Fruit-Picker; and we do hereby declare that the following is a full and exact description thereof, reference being had to the accompanying drawings, making a part of this specification, in which—

Figure I is a front elevation of our improvement, showing a removable bottom in connection therewith. Fig. II is a side elevation, showing a section of flexible conductor and handle. Fig. III is a perspective of the same.

The nature of this invention relates, first, to the construction of a cylindrical fruit-picker, made conical at its upper end, and having a large hole or opening near its upper end, through which the fruit to be picked passes into the cylinder, and a tapering slit, in which the stem of the fruit may be caught to pluck it from the tree; second, the combination of a flexible bag or hose with this cylindrical picker to conduct the fruit down into a basket without bruising; third, attaching the handle to the picker by means of two staples and a notch in the upper end of the handle, with a wedge between the handle and the cylinder.

Letters of like name and kind refer to like parts in each of the figures.

A represents a hollow cylinder, made of tin or other sheet metal, about eighteen or twenty inches in length and about three or four inches in diameter, more or less. This cylinder is made conical at its upper end, as shown at $a^1$. It has a large hole or opening, as shown at $a^2$, for the admission of apples or other fruit, from the smallest to the largest size. This hole or opening is prolonged into a tapering slit on the upper side thereof, as shown at $a^3$, for the entrance of the stem of the apple or other fruit, in order to cut the stem or sever it from the tree by gentle pull.

B represents a removable bottom for the lower end of the cylinder, which may be put in and taken out at pleasure. When the bottom is in, the cylinder may be filled with fruit and emptied and then again filled.

C is a flexible bag or hose, which is attached to the lower end of the cylinder, (when the bottom is not used,) as shown in the drawings, for the purpose of conducting the fruit down, one apple at a time, without bruising. This hose will be of sufficient length to reach down to the hand of the operator when the picker is used in the tops of the trees, as represented in Fig. III.

D is a wooden handle of any required length, which is connected with the picker by means of the staples E and wedge F.

The staples E are made of the same metal as the cylinder, and attached thereto by rivets, soldering, or otherwise, and sufficiently large to receive the end of the handle.

A notch, $f'$, is cut in the end of the handle to clasp the upper staple, leaving sufficient room for the wedge F to be driven in between the end of the handle and cylinder, and thereby fasten the handle. By taking out this wedge the handle will be loose, and may be removed from the cylinder.

The operation of this device is complete. It is very light and simple of construction.

The operator, taking it in his hands, as shown in Fig. III, can easily thrust it to any part of a fruit-tree, the conical end enabling it to pass easily between the limbs and twigs of the tree to the fruit, taking an apple, pear, peach, or other fruit in at the aperture $a^1$, the stem passing into the slit $a^2$. Then a gentle pull will pluck the fruit, and it will drop into the cylinder and run down the flexible hose to the hand of the operator, who will then open his hand and allow it to pass along into a basket. The apples or other fruit thus plucked will come down one at a time, without marring or bruising. All the fruit upon the tree may be thus picked and put into baskets without once lowering the picker from the tree-top.

When only a few apples or peaches are required for immediate use, and when selections are to be made for immediate use, the bottom B may be used instead of the flexible hose, and the cylinder filled and then lowered away, and the fruit emptied therefrom.

What we claim as our invention, and desire to secure by Letters Patent, is—

1. A hollow cylindrical fruit-picker, A, made conical at its upper end, and a large hole or opening and tapering slit near its upper end, with or without the removable bottom B, substantially as described.

2. The combination of a flexible bag or hose, C, with said cylindrical picker, for the purposes and substantially as described.

3. Attaching the handle to the cylinder A by means of the staples E, wedge F, and notch $f'$, substantially as set forth.

L. RICHARDS.
D. LINCOLN.

Witnesses:
B. H. MEUHLE,
E. B. FORBUSH.